G. CORBETT.

Corner Strips.

No. 5,179. Reissued Dec. 10, 1872.

Attest;
Andrew Zane Jr.
Geo. R. Patterson

Inventor;
George Corbett
per George E. Buckley
Attorney

UNITED STATES PATENT OFFICE.

GEORGE CORBETT, OF PITTSBURG, PENNSYLVANIA.

IMPROVEMENT IN CORNER-STRIPS.

Specification forming part of Letters Patent No. 131,506, dated September 24, 1872; reissue No. 5,179, dated December 10, 1872.

*To all whom it may concern:*

Be it known that I, GEORGE CORBETT, of Pittsburg, county of Allegheny and State of Pennsylvania, did invent a certain new and useful Improvement in Corner-Strips for Plastered Buildings; and I do hereby declare that the following is a full, clear, and exact description thereof, reference being had to the accompanying drawing and to the letters of reference marked thereon.

The nature of my invention consists in a metallic corner-strip for sustaining plaster on the corners of chimney-walls and similar projections having sharp corners, said strip being in one piece, and longitudinally bent at an obtuse angle in cross-section; also, in a strip of the above description, provided with a series of apertures in one or both of its wings; also, in a strip for the above purpose, longitudinally bent at an obtuse angle, having one wing narrower than the other.

To enable others skilled in the art to make and use my invention, I will proceed to describe its construction and mode of application.

Figure 1:
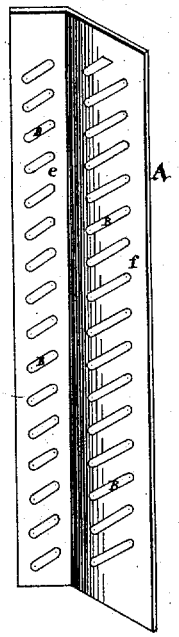
Figure 2:
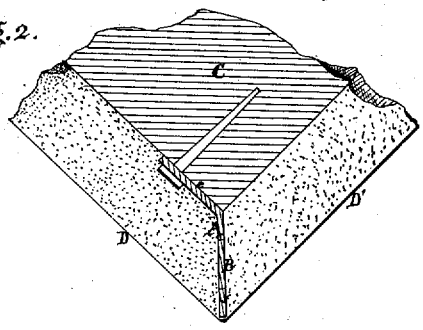

In the accompanying drawing, Figure 1 represents a perspective view of my improvement in corner-strips; and Fig. 2, a horizontal transverse section of a chimney-corner, its plastered surfaces, and corner-strip.

A is the corner-strip, which is formed of plate-iron, hoop-iron, or sheet metal, of suitable width, and bent, as represented in Figs. 1 and 2, so as to form the wings *e* and *f*, which are provided with a series of apertures—preferably elongated apertures B—arranged at an acute angle to the transverse plane of the corner-strip. The strip is secured to the brickwork C by means of nails passing through the apertures of one of the wings *e* or *f*, which wings may be made of different widths to adapt them for different thicknesses of the plastered surface. D and D′ represent the plaster-surfaces of the chimney-corner, which are united by the plaster passing through the apertures of the wing *f*, as indicated in Fig. 2. By thus uniting the plaster surface at the corner through the medium of the strip A it will be so strengthened as to avoid the liability of breakage.

It is best to arrange the apertures at a slant or angle, as, in attaching the strip to the corner of stone, brick, or other wall to be plastered, the openings will invariably expose all the joints between the bricks or stone of which the wall is composed, thus enabling a nail or nails to be driven in to secure the strip to the wall before the plaster is applied; while, at the same time, the openings, on the wing which projects, fulfill their purpose by allowing the plaster to meet and unite through them.

I wish it clearly understood that I do not claim, broadly, metal strips for supporting the plastered surfaces of buildings; but—

What I claim as my invention is—

1. A corner-strip for buildings made of one piece of metal, and longitudinally bent at an obtuse angle, substantially as described.

2. A corner-strip, for supporting the plastered corners in buildings, pierced with apertures to allow the plaster to meet and unite through them.

3. A corner-strip for buildings, composed of two wings, having one or both of said wings pierced with holes or with slotted apertures to meet the joints between the bricks or stones composing the wall, for securing either of said wings against the wall, substantially as and for the purpose described.

4. A corner-strip for buildings made of one piece of metal, bent as described, one wing being narrower than the other, substantially as set forth.

GEO. CORBETT.

Witnesses:
GEO. H. WOODS,
CLARK H. JOHNSON.